United States Patent [19]
Asou

[11] Patent Number: 5,529,088
[45] Date of Patent: Jun. 25, 1996

[54] RAIL-MOUNTED AGGREGATE VALVE

[75] Inventor: Yoshio Asou, Ibaraki, Japan

[73] Assignee: SMC Corporation, Tokyo, Japan

[21] Appl. No.: 512,403

[22] Filed: Aug. 8, 1995

[30] Foreign Application Priority Data

Sep. 21, 1994 [JP] Japan .................. 6-252871

[51] Int. Cl.⁶ .................................................. F16L 3/00
[52] U.S. Cl. ..................... 137/343; 137/271; 251/367
[58] Field of Search ......................... 251/367; 137/343, 137/271, 884

[56] References Cited

U.S. PATENT DOCUMENTS

| | | | |
|---|---|---|---|
| 3,698,432 | 10/1972 | Kutz | 137/271 |
| 4,082,324 | 4/1978 | Obrecht | 137/271 |
| 4,469,128 | 9/1984 | Petrimaux et al. | |
| 4,768,559 | 9/1988 | Hehl | 251/367 |
| 4,917,143 | 4/1990 | Grooms | 137/343 |
| 5,025,834 | 6/1991 | Stoll | 137/271 |

FOREIGN PATENT DOCUMENTS

| | | |
|---|---|---|
| 2504610 | 10/1982 | France . |
| 2263154 | 7/1993 | United Kingdom . |

*Primary Examiner*—A. Michael Chambers
*Attorney, Agent, or Firm*—Oblon, Spivak, McClelland, Maier & Neustadt

[57] ABSTRACT

On a bottom cover 18, which is mounted on bottom surface of a valve body 6 of selector valves 1A and 1B for the purpose of covering unnecessary holes, engaging sectors 28 are formed, and by engaging the engaging sectors 28 with engaging edges 4b and 4b of a rail 4, the selector valves 1A and 1B are mounted on the rail 4 via the bottom cover 18.

6 Claims, 4 Drawing Sheets

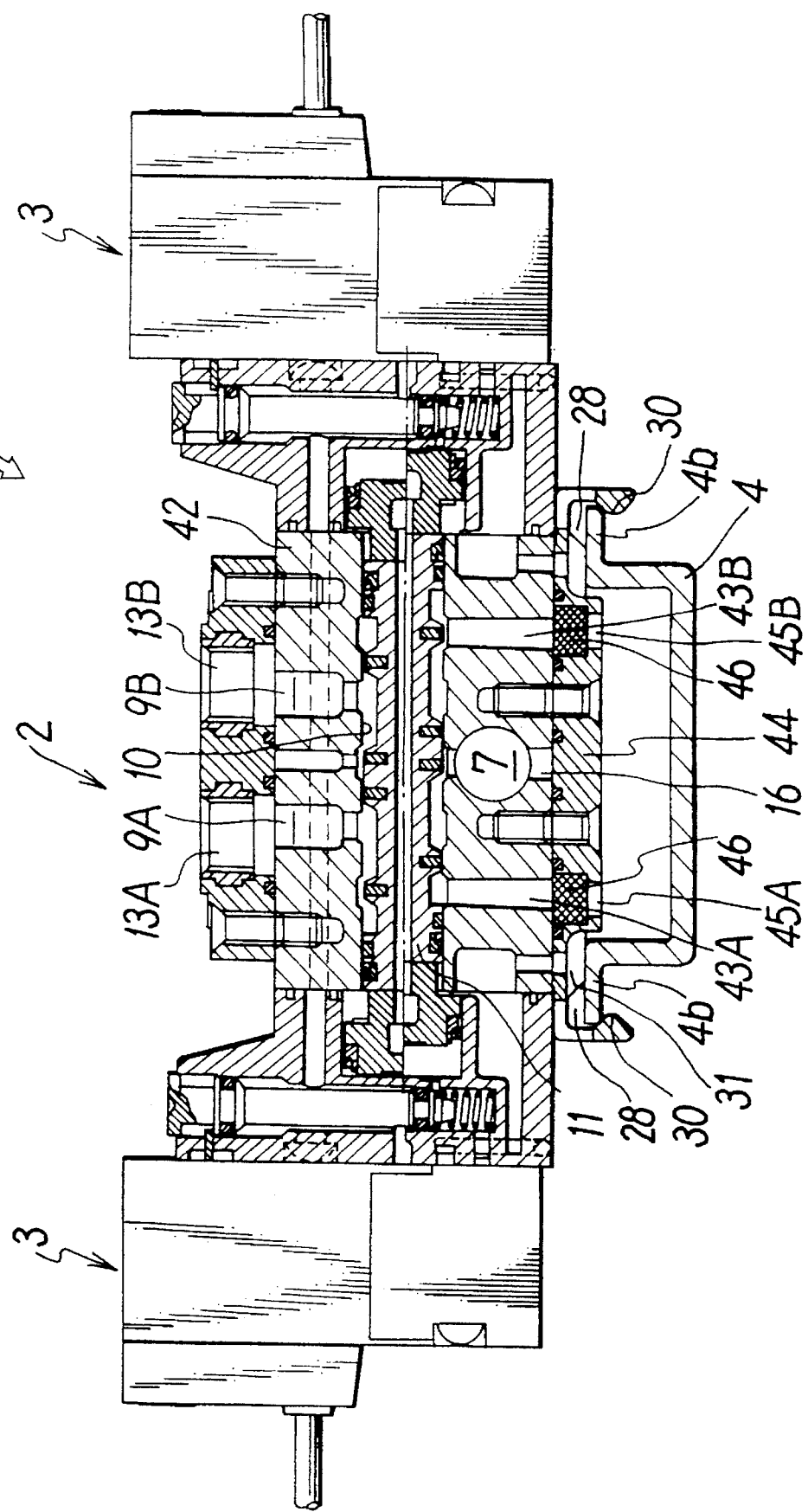

RAIL-MOUNTED AGGREGATE VALVE

BACKGROUND OF THE INVENTION

1. Field of the Invention

The present invention relates to a rail-mounted aggregate valve, in which a plurality of selector valves are aggregated and mounted on a rail.

2. Description of the Prior Art

In the past, an aggregate valve has been known, in which a plurality of selector valves having common passages for supply and discharge are aggregated on a valve body by mutually connecting and integrating in order to collectively supply and discharge pressure fluid to said plurality of selector valves via the common passages, whereby the pressure fluid is supplied to or discharged from each of the selector valves via the common passages, which are communicated with each other as a result of the aggregation.

In general, these selector valves are aggregated by mounting on a groove-shaped rail member and are installed on a control panel or on a fluid pressure equipment via the rail member.

In the conventional method to mount the selector valves on the rail member, engaging sectors such as pawls or components in similar shape are provided on a part of the bottom surface of the valve body in the selector valve, and the engaging sectors are engaged with flange-shaped engaging edges at upper ends of groove walls of the rail member, or the valve body is fixed on the rail member using pins, screws, etc.

However, the former method is disadvantageous in that the engaging sectors with special shape have to be provided on the valve body of the selector valve, which is already complicated enough in structure because a plurality of fluid passages and valve holes are arranged, and this leads to troublesome fabrication processes and higher cost. In particular, punching holes, fabrication holes, etc. for forming through-holes connecting the fluid passage and the valve holes are provided on the bottom surface of the valve body in the aggregated type selector valves, and a bottom cover is mounted to block these holes. As a result, the bottom cover should not become a hindrance when the valves are mounted on the rail, and the formation of the engaging sectors are also limited by the presence of the bottom cover.

On the other hand, the latter method is disadvantageous in that a plurality of selector valves must be fixed using pins, screws, etc., and this requires complicated fixing procedure.

SUMMARY OF THE INVENTION

It is an object of the present invention to provide a selector valve aggregate, in which a bottom cover is mounted on the bottom surface of the valve body of the selector valve for the purpose of blocking unnecessary holes opened on the bottom surface, and by fabricating the bottom cover for mounting purpose, the selector valve can be easily and reliably mounted on a rail without special fabrication of the valve body.

To attain the above object, the rail-mounted aggregate valve of the present invention comprises a plurality of selector valves aggregated by connecting each other in lateral direction, and a rail for mounting these selector valves, whereby said rail has a groove-shaped cross-section and is provided with a pair of flange-shaped engaging edges projecting in directions opposite to each other and in lateral direction of the rail on the upper ends of walls of the groove, each of said selector valves comprises at least one common passage penetrating a valve body in lateral direction and communicatable with a passage of the other selector valve, output ports for connecting output pipes, holes communicated with the common passages and opened on the bottom surface of the valve body, and a bottom cover mounted on the bottom surface of the valve body to block the holes, and said bottom cover has engaging sectors removably engaged with engaging edges of the rail, and the selector valves are mounted on the rail via the bottom cover when the engaging sectors are engaged with the engaging edges.

According to a concrete aspect of the present invention, the engaging edges of the rail are extended outward in lateral direction of the rail from upper ends of both groove walls, each of the engaging sectors of the bottom cover has an inward projection contacting outer ends of the engaging edges from below and a contact sector contacting upper surface of inner end of the engaging edge from above, and the bottom cover is engaged with the rail from the end in longitudinal direction of the rail.

According to another aspect of the invention, said common passages penetrating the valve body include a supply passage for supplying fluid pressure to the selector valves and discharge passage for discharging pressure fluid from the selector valves.

According to still another aspect of the present invention, said common passages penetrating the valve body include only a supply passage for supplying pressure fluid to the selector valves, and discharge outlets for discharging pressure fluid from the selector valves are provided on the bottom surface of the valve body in addition to the holes communicated with the supply passage, and discharge ports are formed at the positions to match the discharge outlets on the bottom cover. On the discharge ports, mufflers made of porous material for reducing exhaust noise can be mounted.

In the present invention, the connection of the common passages between adjacent selector valves can be executed by the use of a connecting fixture with sealing rings on both sides of a pipe shorter than the width of the valve body by engaging each half of the connecting fixture in the passage of the adjacent selector valves.

In the present invention with the above arrangement, the engaging sectors are provided on the bottom cover mounted on the bottom surface of the valve body of the selector valve for the purpose of covering unnecessary openings, and by engaging the engaging sectors with the engaging edges of the rail, the selector valves are mounted on the rail via the bottom cover. Accordingly, there is no need to additionally fabricate the valve body for mounting purpose, which already has complicated structure, and this facilitates the fabrication of the valve body compared with the conventional products and contributes to cost reduction. Because it is not necessary to add special components for mounting purpose, the increase of the number of components can be avoided.

BRIEF DESCRIPTION OF THE DRAWINGS

FIG. 4 is a cross-sectional view of the embodiment of FIG. 2 with the selector valves mounted on a rail.

DETAILED DESCRIPTION OF THE PREFERRED EMBODIMENTS

Figure 1:
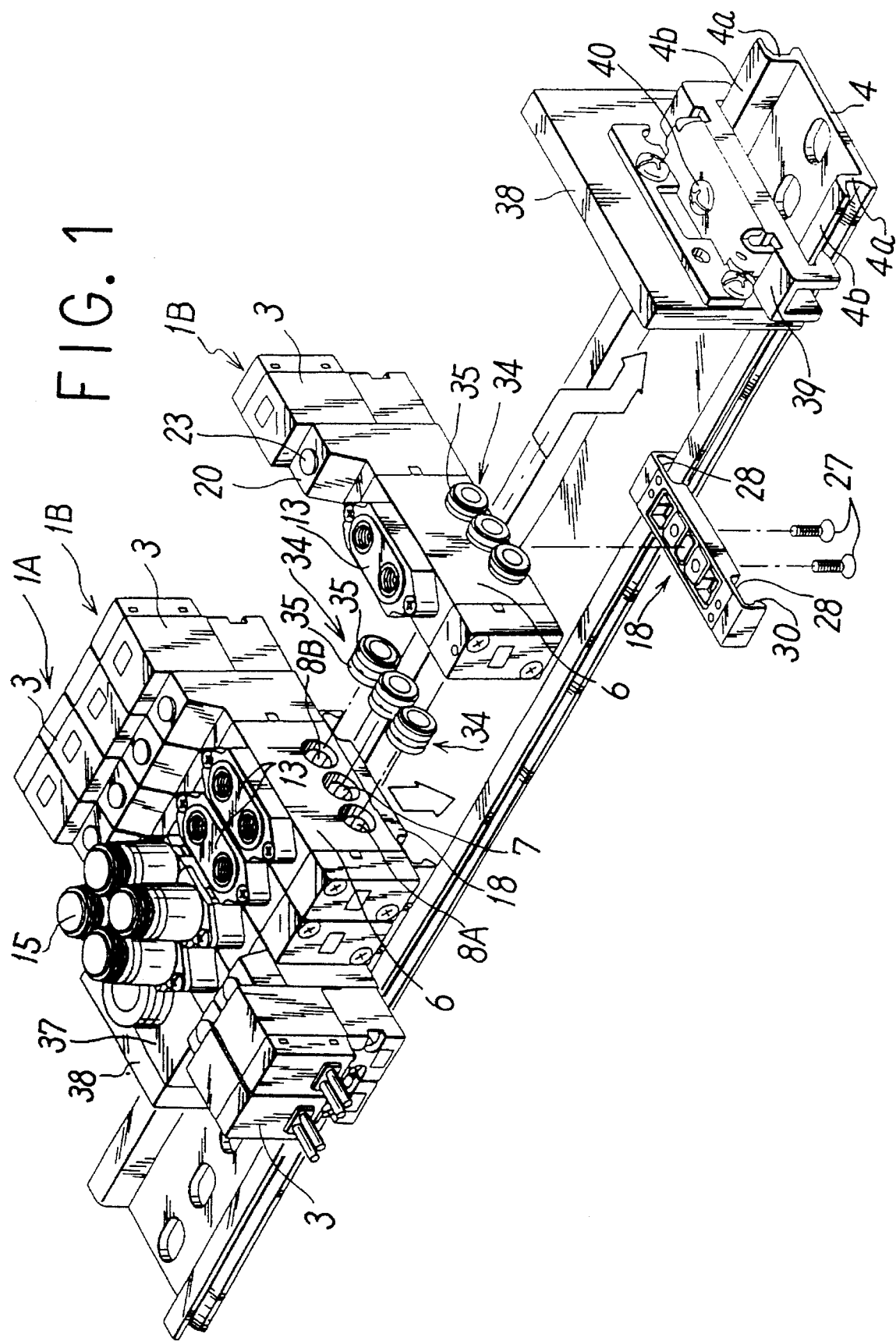
FIG. 1 is an exploded perspective view of an embodiment of the present invention.
Figure 2:
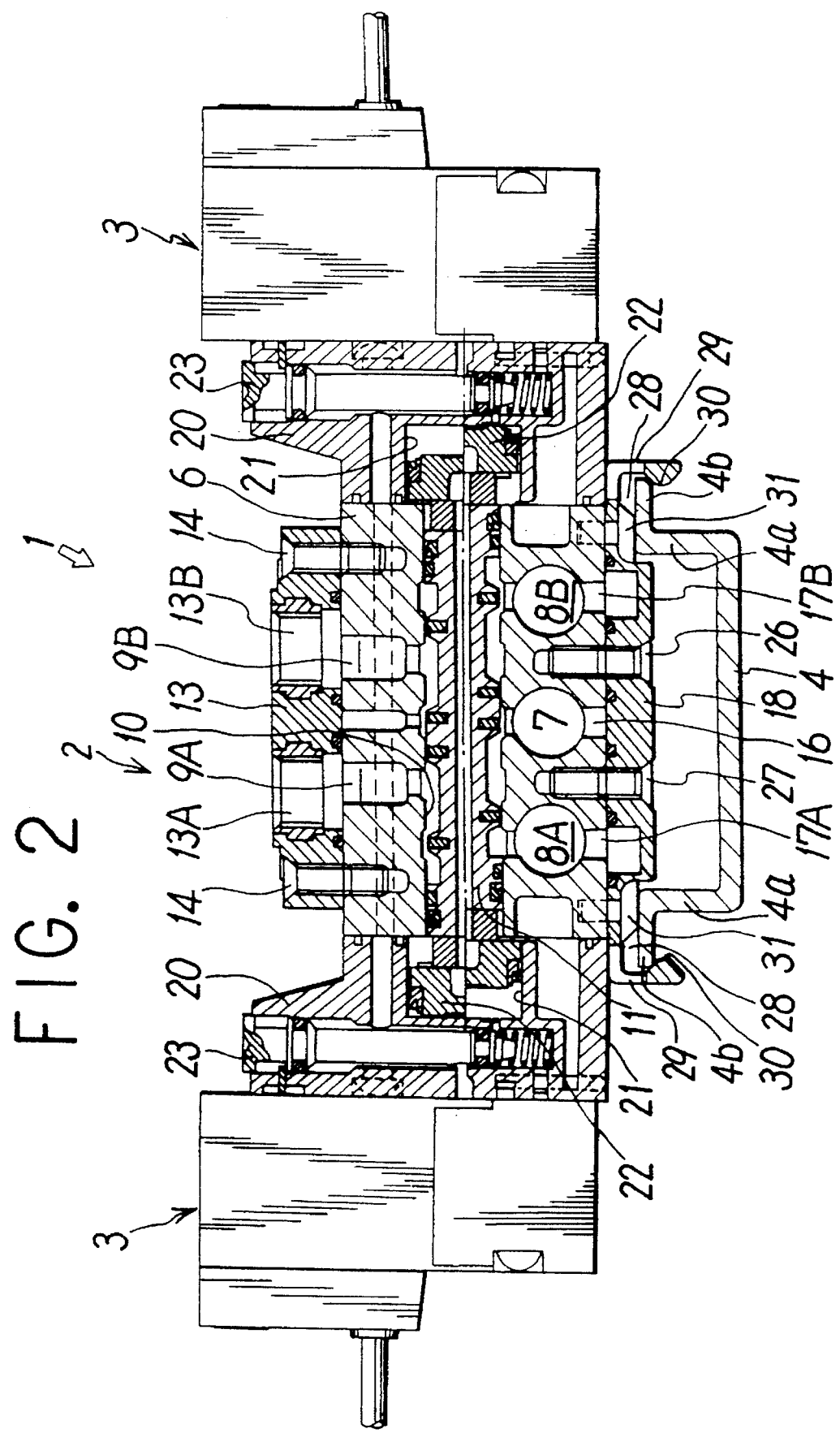
FIG. 2 is a cross-sectional view of the embodiment of FIG. 1 with the selector valves mounted on a rail.

FIG. 1 and FIG. 2 each represents a first embodiment of the present invention. In this first embodiment, two types of selector valves 1A and 1B having a plurality of common passages are aggregated by connecting them in lateral direction and are mounted on a rail 4.

The rail 4 is designed with a groove-shaped cross-section. On upper ends of groove walls 4a and 4a, flange-shaped engaging edges 4b and 4b are arranged, which extend horizontally and outwardly in lateral direction of the rail 4. The selector valve 1A is a double-pilot type selector valve having two pilot valve units 3 and 3, while the selector valve 1B is a single-pilot type selector valve having one pilot valve unit 3. These selector valves 1A and 1B have different number of pilot valve units 3, and this results in some differences in the arrangement and the switching methods, but these valves are substantially the same in basic arrangement and the mounting procedure on the rail 4. Therefore, description will be given below on the double-pilot type selector valve 1A, which is represented in FIG. 2.

Specifically, the selector valve 1A comprises a main valve unit 2 for switching over compressed air and the two electromagnetically operated pilot valve units 3 and 3.

The main valve unit 2 has a valve body 6 in form of rectangular parallelopiped. The valve body 6 comprises a supply passage 7 and discharge passages 8A and 8B, which are penetrating the valve body 6 in lateral direction (a direction perpendicular to the paper surface in FIG. 2) and serve as common passages as these are communicated with passages of the other selector valves 1A and 1B, output bores 9A and 9B opened on upper surface of the valve body 6, and a valve bore 10 communicated with each of the passages and the output ports. In the valve bore 10, a spool type valve member 11 for switching over the fluid is slidably mounted.

On upper surface of the valve body 6, an adaptor 13 for connecting output pipes to the output bores 9A and 9B is fixed by means of mounting screws 14. The adaptor 13 is provided with two output ports 13A and 13B, independently communicated with the output bores 9A and 9B. To the output ports 13A and 13B, output pipes are connected directly or via pipe fittings 15.

At the bottom of the valve body 6, holes 16, 17A and 17B communicated with the supply passage 7 and the discharge passages 8A and 8B are formed. To block these holes, a bottom cover 18 is mounted on the bottom surface of the valve body 6. The holes 16, 17A and 17B are, for examples, punching holes or fabrication holes for providing through-holes communicated with the supply passage 7 or discharge passages 8A and 8B with the valve bore 10 and are not necessarily required.

On both sides in axial direction of the valve body 6, sub-bodies 20 and 20 are mounted respectively, and pistons 22 and 22 are slidably accommodated in the piston chambers 21 and 21 formed in the sub-bodies 20 and 20.

On outer sides of the sub-bodies 20 and 20, the electromagnetically operated pilot valve units 3 and 3 are mounted. By turning the pilot valve units 3 and 3 alternately on and off, pilot pneumatic pressure is supplied to the piston chambers 21 and 21 to drive the pistons 22 and 22 and to switch over the valve member 11.

In FIG. 2, reference numeral 23 represents a manual operating means, by which compressed air from the supply passage 7 is directly supplied to the piston chambers 21 and 21 by manual operation.

The bottom cover 18 fixed on the bottom surface of the valve body 6 is an elongated planar member, which has a width approximately equal to the width of the bottom surface of the valve body 6 and has a length slightly longer the width of the rail 4. On its surface contacting the valve body 6, sealing members 26 for enclosing and sealing each of the holes 16, 17A and 17B are provided and are fixed on the valve body 6 by bolts 27.

On both ends in longitudinal direction of lower surface of the bottom cover 18, engaging sectors 28 to be engaged with the engaging edges 4b and 4b of the rail 4 are formed. The engaging sectors 28 are recessed, and an inward projection 30 to contact each of outer ends of the engaging edges 4b and 4b from below is provided at the lower end of an outer wall 29 of each recess. Also, a contact sector 31 to contact upper surface of each of inner ends of the engaging edges 4b and 4b from above is provided. When these projections 30 and the contact sectors 31 are brought into contact with the engaging edges 4b and 4b, the bottom cover 18 is mounted firmly on the rail 4.

In the selector valve 1A, the engaging sectors 28 of the bottom cover 18 are engaged with the engaging edges 4b and 4b from edns in longitudinal direction of the rail 4. By sliding along the rail 4 to the required position, the selector valve can be mounted on the rail 4 via the bottom cover 18.

On the other hand, the selector valve 1B is provided with one each of the pilot valve unit 3, the pistons 22 and the manual operating means 23. By turning the pilot valve unit 3 on and off, the valve member 11 can be switched over simply by supplying or discharging pilot air pressure with respect to one of the pistons 22. It is mounted on the rail 4 in the same manner as described for the selector valve 1A.

The engaging sectors 28 are provided on the bottom cover 18, which is mounted on the bottom surface of the valve body 6 of the selector valves 1A and 1B for the purpose of covering the holes 16, 17A and 17B, and the selector valves are mounted on the rail 4 via the bottom cover 18. Thus, there is no need to newly fabricate the valve body 6, which has essentially complicated structure, and this facilitates the fabrication of the valve body 6 compared with the conventional product and contributes to cost reduction. Because it is not necessary to add specific components for mounting purpose, the increase of the number of the components can be avoided.

The connection of the supply passage 7 and the discharge passages 8A and 8B between the adjacent selector valves can be executed by connecting fixtures 34. The connecting fixture 34 comprises seal rings 35 on both sides of a pipe, which is shorter than the width of the valve body 6. By engaging each half of the connecting fixture 34 into the passages of the adjacent selector valves, the passages are communicated with each other as a single passage.

On an end of one side or both sides of the selector valves 1A and 1B, which are connected as an aggregation, a port block 37 is mounted on the rail 4 by the same means as the engaging sectors provided on the bottom cover 18 of the selector valve or by other proper means. A side block 38 is provided further on outer side of the port block 37, and a fixing hardware 39 for fixing the entire system is mounted on the rail 4 by a screw 40 on outer side of the side block 38.

The port block 37 is provided with a supply port and a discharge port, which are communicated with the supply passage 7 and the discharge passages 8A and 8B, i.e. common passages, and the supply and the discharge of the compressed air are collectively carried out via these ports.

In case the port block 37 is provided on each side of the selector valves 1A and 1B, which are aggregated, ends of the supply passage 7 and the discharge passages 8A and 8B are blocked at the positions of these port blocks 37. In case the port block 37 is provided only on one side, the opposite ends of the supply passage 7 and the discharge passages 8A and 8B are blocked by the side block 38.

Figure 3:
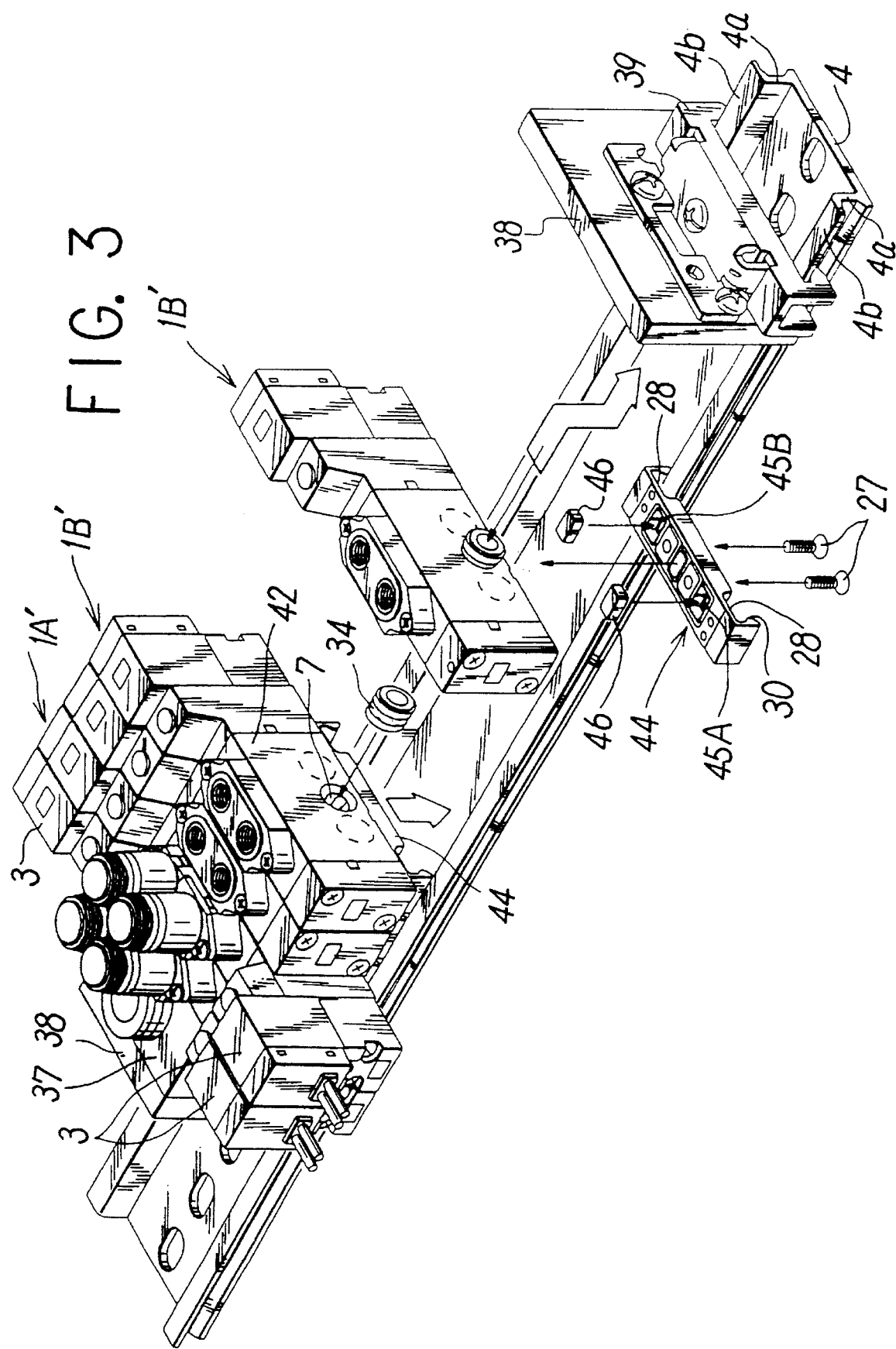
FIG. 3 is an exploded perspective view of a second embodiment of the present invention.

FIG. 3 and FIG. 4 each represents a second embodiment of the present invention. This second embodiment is different from the above first embodiment only in that the selector valves 1A' and 1B' have only one common passage and that the fluid is discharged separately from each selector valve. The mounting structures of the selector valves 1A' and 1B' on the rail 4 are substantially the same as the first embodiment.

In the selector valves 1A' and 1B', a valve body 42 has only one supply passage 7, and compressed air is supplied concentratively through the supply passage 7.

On lower surface of the valve body 42, discharge holes 43A and 43B are formed, and discharge ports 45A and 45B are provided on a bottom cover 44 mounted on the lower surface at the positions to match the discharge holes 43A and 43B. Mufflers 46 and 46 made of porous materials are mounted on the discharge ports.

The other arrangement and operation of the second embodiment are substantially the same as those of the first embodiment. Thus, the same component as in the first embodiment is referred by the same symbol, and detailed description is not given here.

When the valve body 6 having a plurality of common passages as used in the first embodiment is used and the unnecessary common passages are blocked by plugs, the same function as that of the second embodiment can be accomplished. As the above plugs, those designed in the same shape as the connecting fixture 34 and not hollow are preferably used.

In the above embodiments, double-pilot type selector valves and a single pilot type selector valve are used, whereas it is needless to say that only one type of selector valve may be used.

In the examples shown in the figures, the selector valves are 5-port valves in all cases, while the present invention is not limited to the 5-port valve, and 3-port valve or 4-port valve may be used. Or, instead of the pilot valve, a direct-operating electromagnetic selector valve may be used. Further, a valve driven by mechanical driving means may be used.

What we claim are:

1. A rail-mounted aggregate valve, comprising a plurality of selector valves aggregated by connecting in lateral direction and a rail for mounting the selector valves, whereby:

said rail has a groove-shaped cross-section and is provided with a pair of flange-shaped engaging edges projecting in directions opposite to each other and in lateral direction of the rail on upper end of walls of the groove;

each of said selector valves comprises at least one common passage penetrating a valve body in lateral direction and communicatable with a passage of the other selector valve, output ports for connecting output pipes, holes communicated with the common passages and opened on the bottom surface of the valve body, and a bottom cover mounted on the bottom surface of the valve body to block the holes; and said bottom cover has engaging sectors removably engaged with engaging edges of the rail, and the selector valves are mounted on the rail via the bottom cover when the engaging sectors are engaged with the engaging edges.

2. A rail-mounted aggregate valve according to claim 1, wherein the engaging edges of the rail are extended outwardly in lateral direction of the rail from upper ends of the groove walls, each of the engaging sectors of the bottom cover comprises an inward projection contacting each of outer ends of the engaging edges from below and a contact sector for contacting upper surface of each of inner ends of the engaging edges, and by engaging the contact sectors with the engaging edges from ends in longitudinal direction of the rail, the bottom cover is mounted on the rail.

3. A rail-mounted aggregate valve according to claims 1 or 2, wherein the common passages penetrating the valve body include a supply passage for supplying pressure fluid to the selector valves and discharge passages for discharging pressure fluid from the selector valves.

4. A rail-mounted aggregate valve according to claims 1 or 2, wherein said common passages penetrating the valve body include only a supply passage for supplying pressure fluid to the selector valves, discharge outlets for discharging pressure fluid from the selector valves are provided on the bottom surface of the valve body in addition to the holes communicated with the supply passage and discharge ports for communicating the discharge outlets to outside are opened at positions to match the discharge outlets on the bottom cover.

5. A rail-mounted aggregate valve according to claim 4, wherein the discharge ports on the bottom cover are provided with mufflers made of porous material to reduce exhaust noise.

6. A rail-mounted aggregate valve according to claims 1 or 2, wherein connecting fixtures each having seal rings on both sides of a pipe shorter than the width of the valve body are used to connect the common passages between the adjacent selector valves and each half of the connecting fixture is engaged in the passage of the adjacent selector valves.

\* \* \* \* \*